United States Patent Office 3,314,219
Patented Apr. 18, 1967

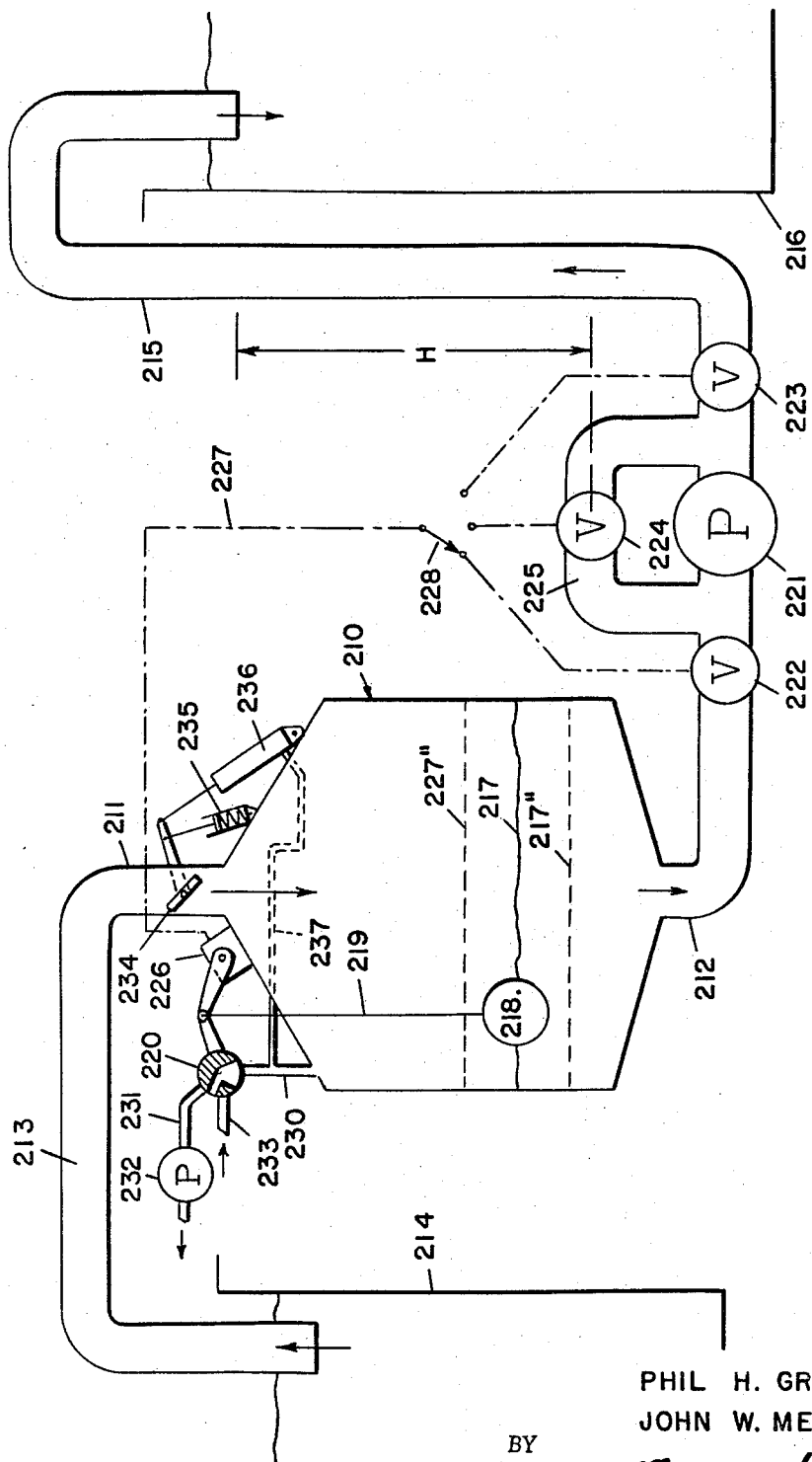

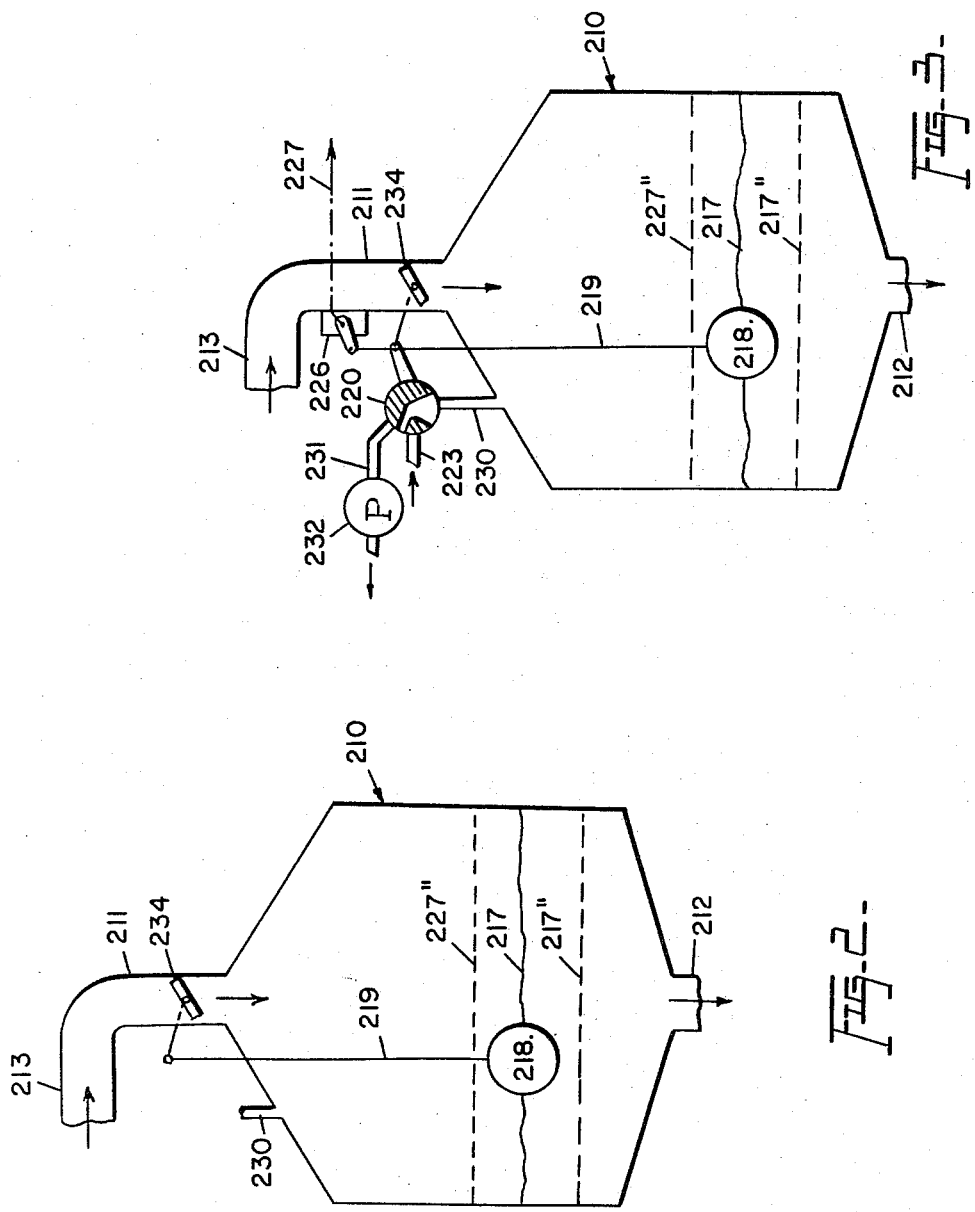

3,314,219
DRILLING MUD DEGASSERS FOR OIL WELLS
Phil H. Griffin III, Fort Worth, Tex., and John W. Melton, Jr., Lafayette, La., assignors to Bass Brothers Enterprises, Inc., Fort Worth, Tex.
Filed Mar. 10, 1965, Ser. No. 438,644
20 Claims. (Cl. 55—167)

The present application is a continuation-in-part of (1) our application Ser. No. 299,317 filed Aug. 1, 1963, now abandoned which in turn is a continuation-in-part of our earlier application Ser. No. 37,685 filed June 21, 1960, now abandoned, and (2) our application Ser. No. 308,314 filed Sept. 11, 1963, now U.S. Pat. No. 3,241,295 also a continuation-in-part of the aforesaid application Ser. No. 37,685.

The invention relates to new and useful improvements in drilling mud degassers for oil wells, and in particular the invention concerns itself with certain improvements in mud degassers of the general type disclosed in the aforementioned applications.

Applications Ser. No. 37,685 and No. 308,314 disclose a mud degasser vacuum tank having a mud inlet and a mud outlet, with means for maintaining the interior of the tank at sub-atmospheric pressure for extraction of gas from mud flowing through the tank. They also disclose, inter alia, a mud jet at the outlet side of the tank for effecting the mud flow through the tank, and valve means at the inlet side for controlling the flow of mud into the tank in response to variations of mud level in the tank.

Numerous efforts previously had been made to eliminate the required use of the mud jet for effecting the flow of mud, as for example, by substituting a centrifugal pump for the mud jet. However, such previous efforts have not been successful inasmuch as a pump tends to become air-locked when the supply of mud to the tank is insufficient, or when vortexing of mud in the tank permits air or gas to enter the pump. Even when self-priming centrifugal pumps are used, several minutes may elapse before the pump resumes effective pumping action and during that period the efficiency of the degassing operation in the tank is materially affected.

The present invention eliminates these difficulties by providing an arrangement wherein any mechanical pump, including a centrifugal pump, may be utilized in place of the mud jet in an efficient manner, while maintaining the mud level in the tank substantially constant.

Other objects, features and advantages of the invention will become apparent from the following description taken in conjunction with the accompanying drawings, wherein:

FIGURE 1 is a diagrammatic illustration of the mud degasser apparatus of the present invention;

FIGURE 2 is a diagrammatic illustration, in fragmentary form, of a modified arrangement; and FIGURE 3 is a fragmentary diagrammatic illustration of another modified arrangement.

Referring now to the accompanying drawings in detail, more particularly to FIG. 1 thereof, the general reference numeral 210 designates a mud degasser vacuum tank which is constructed in substantially the same manner as the degasser tank in the aforementioned applications Ser. No. 37,685 and No. 308,314, the tank including a mud inlet 211 and a mud outlet 212. The inlet 211 has connected thereto a mud inlet pipe 213 which communicates with a tank 214 containing mud from the well which is to be degassed. The outlet 212 has connected thereto a mud delivery line or pipe 215 which discharges into a tank 216, from which degassed mud is recirculated back to the well.

As disclosed in the aforementioned applications Ser. No. 37,685 and No. 308,314, means are provided for maintaining the interior of the degasser tank 210 at sub-atmospheric pressure, such means being responsive to variations in the height of mud level 217 in the degasser tank, as sensed by a float 218 which is operatively connected by a rod 219 to a vacuum control value 220. The vacuum control valve 220 has a line 230 communicating with the interior of the tank 210, a line 231 communicating with a vacuum pump 232, and a line 233 communicating with the atmosphere. When the mud level 217 falls, for example to the level 217", the float 218 and rod 219 move the valve 220 to a position wherein the line 230 is communicated through the line 231 with the vacuum pump 232, while the line 233 to the atmosphere is closed. The pump 232 thus acts to increase the vacuum in the tank, which in turn causes an increased flow of mud through the mud inlet pipe 213, so that the mud level in the tank rises. If the mud level rises sufficiently, for example to the level 227", the float 218 moves the valve 220 to a position wherein the line 230 is communicated through the line 233 to the atmosphere while the line 231 to the vacuum pump 232 is closed. This permits air from the atmosphere to enter the tank, thus decreasing the vacuum in the tank and reducing the flow of mud through the inlet pipe 213 so that the mud level in the tank is lowered. It will be apparent that in this manner both the degree of vacuum in the tank and the rate of mud flow into the tank are controlled in response to rising and falling of the mud level in the tank and that, conversely, the mud level is kept substantially constant.

If desired, a suitable valve such as a butterfly valve 234 may be provided in the mud inlet 211 to positively control the rate of flow of mud into the tank, in addition to the flow control afforded by the increase or decrease of vacuum in the tank, as already described. As disclosed in the aforementioned applications No. 37,685 and No. 308,314, the valve 234 is spring-biased as at 235 to its closed position and is opened against the spring bias 235 by a vacuum operator 236, the latter being connected by a line 237 to the line 230 and thus to the interior of the tank. When the mud level in the tank falls and vacuum in the tank is increased by the valve 220, the operator 236 opens the valve 234 to increase the flow of mud into the tank. Conversely, when the mud level rises and vacuum in the tank is decreased by the valve 220, the valve 234 closes by its spring bias 235 to decrease the flow of mud into the tank. The advantage of using the valve 234 is that it provides a positive, faster acting control of the inflow of mud through the mud inlet 211, as compared to a control afforded merely as a result of variations in the degree of vacuum in the tank. In other words, in the absence of the valve 234, a substantial time lapse could be involved before increase or decrease of vacuum in the tank would be reflected by a corresponding increase or decrease of the inflow of mud, but the presence of the valve 234, positively actuated by the spring bias 235 and vacuum operator 236, renders the mud inflow control virtually instantaneous.

The arrangement thus far described corresponds to that disclosed in the aforementioned applications Ser. No. 37,685 and No. 308,314, both of which also include a mud jet at the outlet side of the vacuum tank for effecting the flow of mud therethrough. However, the present invention substitutes for the mud jet in the mud delivery line 215 any suitable mechanical pump, such as for example, a centrifugal pump 221.

Since it is essential for the rate of mud flow out of the degasser tank to be substantially the same as the rate of mud flow into the tank in order to maintain the mud level 217 in the tank substantially constant, it is necessary to provide means for decreasing the mud output of the pump 221 when the mud level 217 falls and conversely, for increasing the pump output when the mud level 217 rises. The mud output is controlled by valve means 222, 223 and 224 on the mud delivery line 215, which valve means are automatically and selectively controlled by variations in the mud level 217 in the tank. By maintaining this mud level substantially constant, say in a range between the minimum level 217" and the maximum level 227", and mounting the pump 221 so that it is disposed below the minimum mud level 217", assurance is had that no air or gas will be drawn into the pump even if some vortexing of the mud in the degasser tank should occur.

The valve 222 is located in the mud delivery line 215 in series with and upstream from the pump 221, while the valve 223 is similarly located downstream from the pump. The valve 224 is placed in a by-pass 225 which communicates with the line 215 upstream and downstream from the pump at points between the pump and the respective valves 222, 223. It may be explained at this point that the three valves 222, 223, 224 are shown jointly in FIG. 1 for convenience of illustration and also because such three valves may be provided for selective use in the same system. However, any one of the three valves may be provided alone, that is, to the exclusion of the other two, if selective use of the three valve is not desired.

In any event, the valves 222, 223, 224 are automatically closed and opened in response to lowering and raising, respectively, of the mud level in the degasser tank, as sensed by the float 218 on the rod 219. Apart from its connection to the aforementioned vacuum control valve 220, the rod 219 also actuates a suitable trigger device 226, the latter being operatively connected as at 227 to the valves 222, 223, 224 so that when the mud level 217 drops to the minimum 217" the valves become closed and conversely, when the mud level rises to the maximum 227", the valves become open. The operative connection 227 between the trigger device 226 and the valves may be mechanical, electrical, hydraulic, pneumatic, or the like, and may embody a suitable selector 228 for selective operation of any one of the three valves alone while the other two inoperative valves are maintained in an open position.

Thue, if for example the valve 222 is operated by the trigger device 226 while the valves 223, 224 are held open, lowering of the mud level 217 in the degasser tank to the minimum 217" will cause the valve 222 to close, so that withdrawal of mud from the tank by the pump 221 will be interrupted until the mud rises to the desired level. The trigger device 226 will then cause the valve 222 to open, thus permitting further pumping of mud out of the tank. The operation is similar if the valve 223 is used in place of the valve 222, although when the valve 222 is used and becomes closed, the pump 221 will be without a mud supply until the valve 222 opens again. If the valve 223 is used and becomes closed, mud will be recirculated by the pump through the by-pass 225 and the open valve 224. If the by-pass were not provided, closing of the valve 223 would create a back pressure on the mud flowing from the pump. If the valve 224 is operated by the trigger device 226 while the valves 222, 223 are held open, the pump 221 will deliver the mud into the tank 216 against the head of mud indicated at H, as long as the valve 224 is closed. However, upon opening of the valve 224, the mud from the pump will follow the path of lesser resistance through the by-pass 225 rather than overcoming the mud head H, thus decreasing the withdrawal of mud from the tank 10.

While various alternative methods of operation have been described as falling within the scope of the invention in its broadest aspects, the preferred mode of operation would be to use valve 223 with valve 222 open or absent. Valve 224 would then be closed or the by-pass eliminated entirely. With a centrifugal pump the outlet may be closed without excessive pressure increase.

It may be noted that while the valve means 222, 223, 224 reduce the total rate of mud flow through the degasser tank 210, this occurs only when the mud level in the degasser tank has fallen, and thus the apparatus is still capable of handling the entire mud flow from the well, regardless of the flow rate.

While in accordance with the preferred embodiments of the invention the valves 222, 223, 224 are preferably used to permit operation of the pump 221 at constant speed, such valves may be eliminated and a control placed on the speed of the pump so that the pump may be slowed down, speeded up or even stopped, as required by the mud level in the degasser tank.

FIGS. 2 and 3 illustrate modified embodiments of the invention, both of which utilize at the outlet side of the degasser tank a mechanical pump 221 and valve means 222, 223, 224 as exemplified in FIG. 1, the disclosure of which pump and valve means has not been repeated in FIGS. 2 and 3. These modified embodiments concern themselves primarily with operation of the mud inlet valve 234, where such is provided.

While in FIG. 1 the valve 234 in the mud inlet 211 is actuated by the spring bias 235 and vacuum operator 236 responding to increase or decrease of vacuum inside the degasser tank to correspondingly increase or decrease the inflow of mud thereinto, in the arrangement of FIG. 2 the valve 234 is operated directly by the float rod 219 so that it is opened when the mud level in the tank falls and is closed when the mud level rises. In this manner the opening and closing of the valve 234 is not controlled by the degree of vacuum in the degasser tank, but rather, by the variations of mud level in the tank as sensed by the float 218, so in that respect the operation of the mud inlet valve 234 is independent of the vacuum conditions in the tank.

In the arrangement of FIG. 3 the inlet valve 234 is also operated directly by the float rod 219 as in FIG. 2 so that the operation of that valve is also independent of the vacuum conditions inside the tank. However, apart from operating the valve 234, the float rod 219 also actuates the vacuum valve 220 and the trigger device 226, as in the embodiment of FIG. 1. The direct operation of the inlet valve 234 by the float rod 219, of course, eliminates the spring bias 235 and vacuum operator 236 used in FIGURE 1, the primary distinction being that in FIGS. 2 and 3 the mud inlet valve 234 responds to variations in mud level directly, rather than to variations in vacuum conditions.

While in the foregoing there have been described and shown the preferred embodiments of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. In a mud degasser apparatus, the combination of a mud degasser vacuum tank having a mud inlet and a mud outlet, means for maintaining sub-atmospheric pressure within said tank, means for controlling the flow of mud into the degasser tank and for controlling the degree of vacuum within the tank in accordance with the mud level within the tank, mechanical pump means connected to said mud outlet for effecting flow of mud through the tank, and means responsive to lowering of mud level in the tank for controlling the mud output of said pump means to maintain the mud level in the tank substantially constant.

2. In a mud degasser apparatus, the combination of a mud degasser vacuum tank having a mud inlet and a mud outlet, means for maintaining sub-atmospheric pressure within said tank, means for controlling the flow of mud into the degasser tank and for controlling the degree of vacuum within the tank in accordance with the mud level in the tank, a mud delivery line connected to said mud outlet, mechanical pump means provided in said mud delivery line for effecting flow of mud through the tank, valve means in said mud delivery line, and means responsive to lowering and raising of mud level in the tank for respectively closing and opening said valve means to maintain the mud level in the tank substantially constant.

3. The apparatus as defined in claim 2 wherein said pump means and said valve means are in series in said mud delivery line, with the pump means downstream from the valve means.

4. The apparatus as defined in claim 2 wherein said pump means and said valve means are in series in said mud delivery line, with the valve means downstream from the pump means, and a pump by-pass connected from said mud delivery line immediately downstream of said pump means to said mud delivery line upstream from said pump means.

5. The apparatus as defined in claim 2 together with a pump by-pass connected to said mud delivery line upstream and downstream from said pump means, said valve means being provided in said pump by-pass.

6. The apparatus as set forth in claim 1 wherein said pump means is a centrifugal pump.

7. The apparatus as defined in claim 2 wherein said pump means is a centrifugal pump.

8. In a mud degasser apparatus, the combination of a mud degasser vacuum tank having a mud inlet and a mud outlet, means for maintaining sub-atmospheric pressure within said tank, means for controlling the flow of mud into the degasser tank in accordance with the mud level within the tank, mechanical pump means connected to said mud outlet for effecting flow of mud through the tank, and means responsive to lowering of mud level in the tank for controlling the mud output of said pump means to maintain the mud level in the tank substantially constant.

9. The apparatus as defined in claim 8 wherein said means for controlling the flow of mud into said tank include valve means in said mud inlet, and mud level responsive means actuating said valve means.

10. The apparatus as defined in claim 8 wherein said means for controlling the flow of mud into said tank include valve means in said mud inlet, and means responsive to the degree of vacuum in the tank for actuating said valve means.

11. In a mud degasser apparatus, the combination of a mud degasser vacuum tank having a mud inlet and a mud outlet, means for maintaining sub-atmospheric pressure within said tank, means for controlling the degree of vacuum in said tank in accordance with the level of mud in the tank, means for controlling the flow of mud into the tank in accordance with the degree of vacuum therein, mechanical pump means connected to said mud outlet for effecting flow of mud through the tank, and means responsive to lowering of mud level in the tank for controlling the mud output of said pump means to maintain the mud level in the tank substantially constant.

12. In a mud degasser apparatus, the combination of a mud degasser vacuum tank having a mud inlet and a mud outlet, means for maintaining sub-atmospheric pressure within said tank, means for controlling the flow of mud into said tank in accordance with the mud level in the tank, a mud delivery line connected to said mud outlet, mechanical pump means provided in said mud delivery line for effecting flow of mud through the tank, valve means in said mud delivery line, and means responsive to lowering and raising of mud level in the tank for respectively closing and opening said valve means to maintain the mud level in the tank substantially constant.

13. The apparatus as defined in claim 12 wherein said means for controlling the flow of mud into said tank include valve means in said mud inlet, and mud level responsive means for actuating said last mentioned valve means.

14. The apparatus as defined in claim 12 wherein said pump means is a centrifugal pump.

15. The apparatus as defined in claim 12 together with means for controlling the degree of vacuum in said tank in accordance with the mud level in the tank, said means for controlling the flow of mud into the tank including valve means in said mud inlet, and means responsive to the degree of vacuum in the tank for actuating said last mentioned valve means.

16. The apparatus as defined in claim 12 wherein said pump means and said valve means are in series in said mud delivery line, with the pump means downstream from the valve means.

17. The apparatus as defined in claim 12 wherein said pump means and said valve means are in series in said mud delivery line, with the valve means downstream from the pump means, and a pump by-pass connected from said mud delivery line immediately downstream of said pump means to said mud delivery line upstream from said pump means.

18. The apparatus as defined in claim 12 together with a pump by-pass connected to said mud delivery line upstream and downstream from said pump means, said valve means being provided in said pump by-pass.

19. In a mud degasser apparatus, the combination of a mud degasser vacuum tank having a mud inlet and a mud outlet, means for maintaining sub-atmospheric pressure within said tank, valve means in said mud inlet for controlling the flow of mud into the tank, means responsive to the level of mud in the tank for actuating said valve means and said sub-atmospheric pressure maintaining means, mechanical pump means connected to said mud outlet for effecting flow of mud through the tank, and valve means in said mud outlet for controlling the output of mud by said pump means, said last mentioned valve means being actuated by said mud level responsive means to maintain the mud level in the tanks substantially constant.

20. The apparatus as defined in claim 19 wherein said pump means is a centrifugal pump.

References Cited by the Examiner
UNITED STATES PATENTS

| | | | |
|---|---|---|---|
| 1,387,748 | 8/1921 | Wilson | 55—165 |
| 1,556,098 | 10/1925 | Gibson | 55—39 |
| 1,724,537 | 8/1929 | Waters | 55—167 |
| 1,910,088 | 5/1933 | Cherry | 55—165 |
| 2,195,898 | 4/1940 | Newton | 55—190 X |
| 2,339,369 | 1/1944 | Baker | 55—165 |
| 2,357,445 | 9/1944 | Baker | 55—160 X |
| 2,453,217 | 11/1948 | Gregg et al. | 55—169 X |
| 2,515,647 | 7/1950 | Hunt et al. | 55—167 X |
| 2,610,697 | 9/1952 | Lovelady et al. | 55—164 |
| 2,616,514 | 11/1952 | Shobe | 55—165 |
| 2,989,143 | 6/1961 | Hallstrom | 55—167 X |

REUBEN FRIEDMAN, *Primary Examiner.*

J. ADEE, *Assistant Examiner.*